United States Patent [19]

Rousseau

[11] Patent Number: 5,060,510

[45] Date of Patent: Oct. 29, 1991

[54] METHOD OF CORRECTING VARIATIONS IN RADIAL FORCE BETWEEN A TIRE AND THE GROUND

[75] Inventor: Jean-Baptiste Rousseau, Riom, France

[73] Assignee: Michelin & Cie Compagnie Generale des Etablissements Michelin, Clermont-Ferrand Cedex, France

[21] Appl. No.: 540,902

[22] Filed: Jun. 20, 1990

[30] Foreign Application Priority Data

Jun. 30, 1989 [FR] France .................................. 89 09070

[51] Int. Cl.$^5$ ........................................... G01M 17/02
[52] U.S. Cl. .................................................. 73/146
[58] Field of Search ................... 73/146; 152/539, 543

[56] References Cited

U.S. PATENT DOCUMENTS

| | | | |
|---|---|---|---|
| 3,203,461 | 8/1965 | Enabnit | 152/543 |
| 3,490,277 | 1/1970 | Sanders et al. | 73/146 |
| 3,725,163 | 4/1973 | Hofelt | 73/146 |
| 4,393,913 | 7/1983 | Grawey et al. | 152/543 |

FOREIGN PATENT DOCUMENTS 3529509  2/1987  Fed. Rep. of Germany .

Primary Examiner—Donald O. Woodiel
Attorney, Agent, or Firm—Brumbaugh, Graves, Donohue & Raymond

[57] ABSTRACT

A method of correcting the variations of radial force between a tire and the ground, including measuring on a uniformity machine the variation in radial force of the tire/mounting-rim rolling assembly, reconstituting a radial variation on basis of the harmonic variations to be corrected, and effecting said correction by means of wedges in the form of circular rings placed between the mounting rim and the beads of the tire.

10 Claims, 4 Drawing Sheets

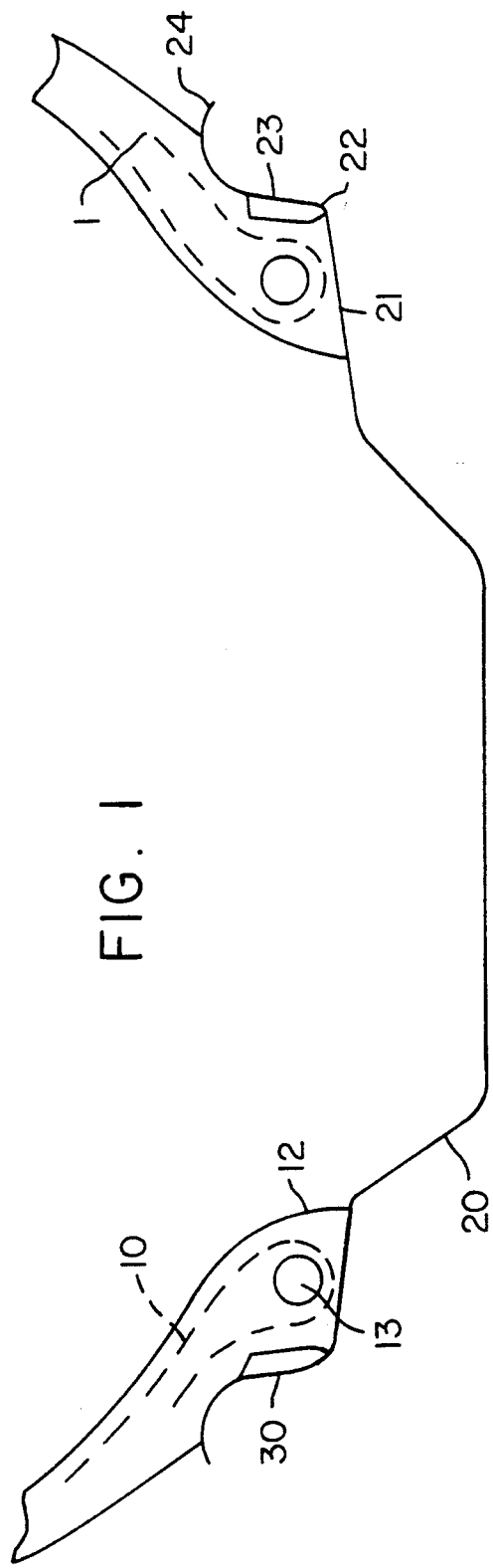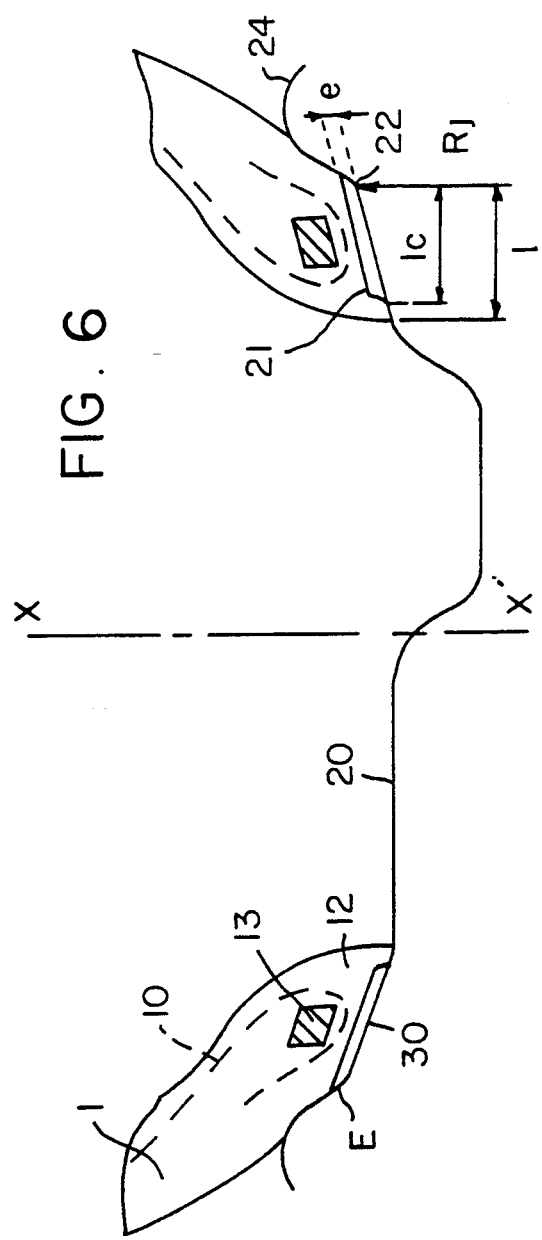

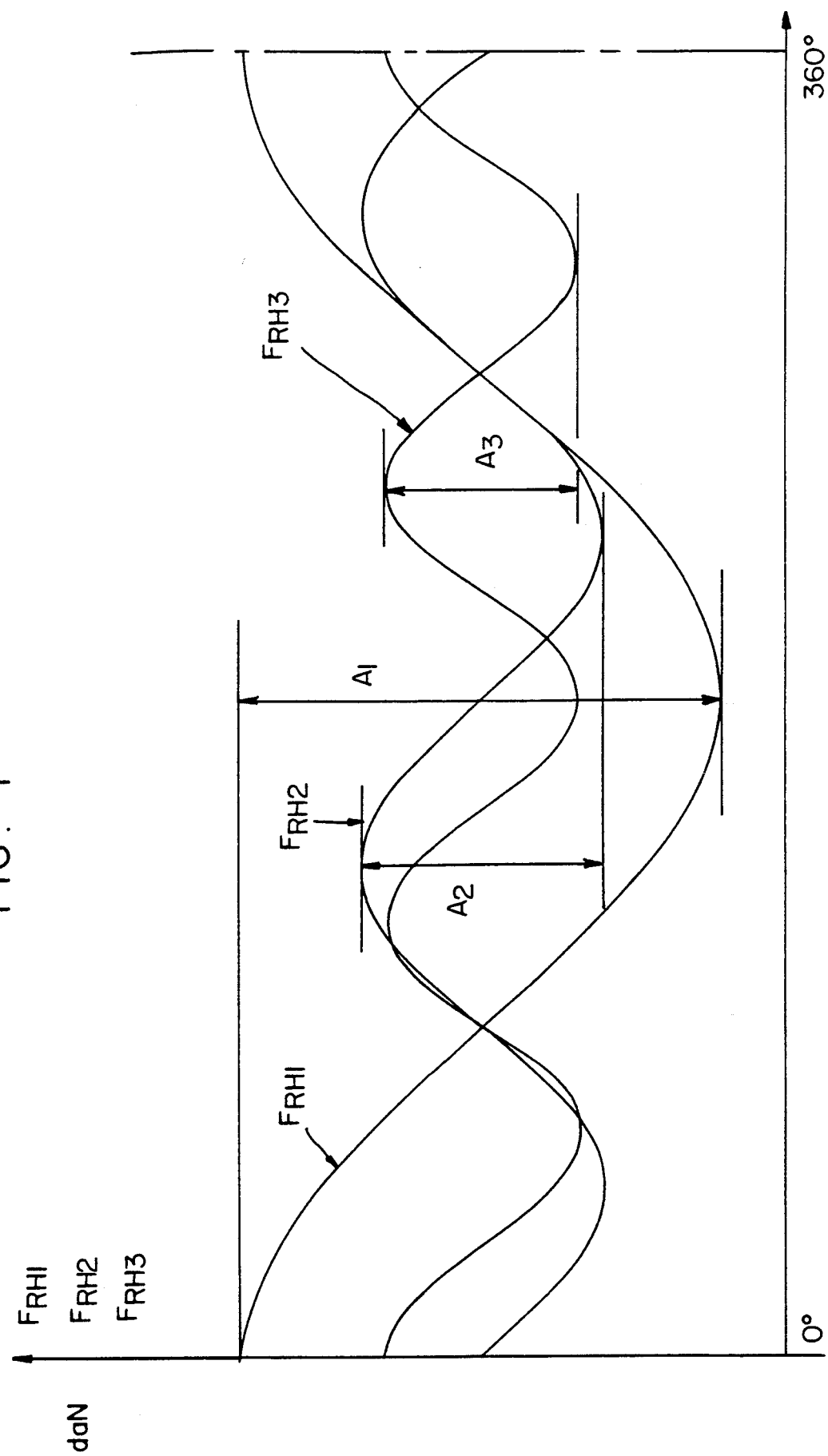

METHOD OF CORRECTING VARIATIONS IN RADIAL FORCE BETWEEN A TIRE AND THE GROUND

BACKGROUND OF THE INVENTION

The present invention relates to a method of correcting defects in uniformity of a tire and, more particularly, it relates to a method which makes it possible to reduce the variations of force in tires, said variations producing a number of unfavorable effects in the driving of a vehicle, such as various vibrations, poor straight-line stability of the vehicle, comfort, low level and abnormal feelings in steering.

These defects in uniformity have numerous causes, and it is very difficult to build a perfectly uniform tire in view of the numerous variables which exist. Some of these variables can be enumerated: dimensional irregularities of the semi-finished products entering into the formation of the tire, irregularities in weight of the products themselves, irregularities in the composition and physical properties, irregularities due to the methods of building the tire, such as variations in thickness due to overlap, irregularities due to the vulcanization of the tire, such as variations in vulcanization temperature or variations in position in the vulcanization mold.

The uniformity of a tire is generally measured by the degree of perfection with regard to its physical dimensions, the weight balancing and the variations in dynamic forces. Numerous methods have been used in order to attempt to correct or compensate for each of the irregularities observed. It is known, for instance, to incorporate small amounts of rubber in the crown and in the inside of the tire in order to balance the tire. The compensating for the imbalance of the assembly consisting of tire plus wheel can also be effected by adding small weights on the wheel rim. Furthermore, it is current practice to correct the dimensions of a tire by grinding the tread thereof so as to make it perfectly round and concentric with respect to its axis of rotation.

Measurements of the variations in dynamic forces are at present simple and are carried out on machines, known as "uniformity" machines, which permit the inflated tire under load, mounted on a rotating axle, to travel on a drum the shaft of which is coupled to a relatively complicated system of suitable stress gauges. Means for measuring the forces exerted on these gauges are provided and the signals produced by these forces are transmitted to a reading/recording device.

Numerous tests on vehicles have shown that the variations in radial forces, that is to say in the forces acting perpendicular to the surface of contact between the tire and the ground, were by far the most harmful with regard to the unfavorable effects on the driving and road-holding characteristics of the vehicles. As is known, the recorded curve of the variation in radial force ($F_R$) upon one revolution of the wheel is comparable to the curve representative of a vibratory movement, which can be broken down into a sum of harmonic sinusoidal movements by means of harmonic analyzers. The responsibility for the irregularities produced in the behavior of the vehicle is customarily attributed to the variations of the first harmonic ($F_{RH1}$) and the second harmonic ($F_{RH2}$) since generally they are the most important in amplitude and have the most disturbing frequencies. However, harmonics of a higher order can prove disturbing for certain vehicles in view of their frequencies and therefore the strict control carried out on tires and rolling assemblies, not only as to the variation in total radial force but also as to the harmonics which result therefrom. In general, harmonics of a higher order than 16 are insignificant and are not taken into account.

U.S. Pat. No. 3,724,137 describes a manner of attenuating the variations in radial forces. In combination with the measurement machine, two rotary grinding wheels are placed in positions adjacent to the shoulders of the tread of the tire so that these grinding wheels remove material from the ribs of the shoulders of the tread as a function of the variations in radial forces detected on the drum and measured until these variations have been reduced to a desired acceptable level. Numerous patents are characterized by the use of such a grinding of the tread.

Modifying the thicknesses of the tread by grinding would not appear to be the best solution to contemplate for correcting these variations in dynamic forces since the tread is, in fact, an essential element of the tire as it assures contact with the ground and numerous desired qualities of the tire depend on this contact.

SUMMARY OF THE INVENTION

The object of the present invention is to provide other means of reducing the amount of the variations in radial force on a tire mounted on a rim to an acceptable level without affecting the tread and without altering the other criteria of uniformity and appearance.

The method of the invention consists, in its general principle, in measuring the variation in radial force of the rolling assembly consisting of a tire and mounting rim on a uniformity machine, breaking down the variation obtained into harmonic variations of an order of 1 to 16, checking the amplitudes of these harmonics, recomposing a variation in radial force, referred to as $F_{Rn}$, which takes into account the harmonic to be corrected of the highest order n and all harmonics of lower order, determining the peak-to-peak amplitude of the variation thus obtained as well as the circumferential positions of the optimums (maximum and minimum) of this variation, and, on the basis of the values obtained, modifying the position of the bead wires of the tire by means of wedges, in the form of circular rings, placed between the mounting rim and the beads of the tire, these wedges being of variable thickness circumferentially and being made of a plastic or elastomeric material of a density of at most 1.2.

Various types of rims can be used for a tire. First, a tire can be mounted in a so-called "flat seat" rim, that is to say, a rim the seats of which, seen in cross-section, form angles equal to 5°±1° with the axis of rotation of the tire and the rim flanges of which have a vertical wall of relatively great height. Secondly, a tire, in particular a tire for trucks or buses, can be mounted on a so-called "15° seat" rim, that is to say, a rim the seats of which form angles of 15°±1° with the axis of rotation of the tire and the rim flanges of which are formed exclusively of curves. These two types of rim are well known and they are furthermore standardized by international standards, such as the U.S. standard (TRA) or European standard (ETRTO).

Depending on the type of rim on which the tire is mounted, the change in position of the bead wires is obtained in different ways. Thus, in the event that the tire is mounted on a rim having rim flanges which comprise a part which is perpendicular to the axis of rotation of the tire, the method consists in decreasing the axial distance between the bead wires of the tire by means of compensation wedges placed between the vertical walls of the rim flanges and the corresponding walls of the tire beads. Each wedge has a maximum thickness at the level of the maximum value of the recomposed radial force $F_{Rn}$ and a minimum thickness of 0.3 mm at the level of the minimum value of the radial force $F_{Rn}$. In these two values, the thickness (e), for each point of the curve representing the variation in radial force $F_{Rn}$, is such that the quantity (e−0.3) expressed in mm is proportional to the difference between the value of the radial force measured for the given point and the value of the minimum radial force.

In the event that the tire is mounted on a rim which does not have rim flanges with vertical walls and, in particular, on a so-called 15°-seat rim, the method consists in arranging the compensation wedges between the rim seats and the bead seats. These wedges are in the form of circular rings of circumferentially variable thickness, but, differing from the previous method, the maximum value of the thickness of the wedge corresponds to the minimum value of the radial force ($F_{Rn}$) and, conversely, the minimum value of the thickness corresponds to the maximum value of that force.

The use of these compensation wedges makes it possible, by means of the positioning of the bead wires, to control the path of the wires of the carcass reinforcement of the tire and, accordingly, to effect an overall compensation of the variation in radial force ($F_{Rn}$) whatever the origin of such variation, whether it be a variation due to the shape of the rolling assembly or a variation due to the rigidity of this assembly.

DESCRIPTION OF DRAWINGS

The description given below with reference to the accompanying drawings, given by way of example, will make it clear how the invention can be carried out. In the drawings:

FIG. 1 shows, in part, a cross-section through a tire with radial carcass reinforcement provided with two beads mounted on a flat-seat rim, the rolling assembly being provided with compensation wedges;

FIG. 4 shows, over one revolution of the wheel, the respective variations of the harmonics of the first, second and third order obtained by the decomposing of the total signal measured;

FIG. 6 is a cross-sectional view through a tire and its beads, mounted on a 15°-seat rim, with compensation wedges arranged between seats.

DESCRIPTION OF PREFERRED EMBODIMENTS

Figure 3:
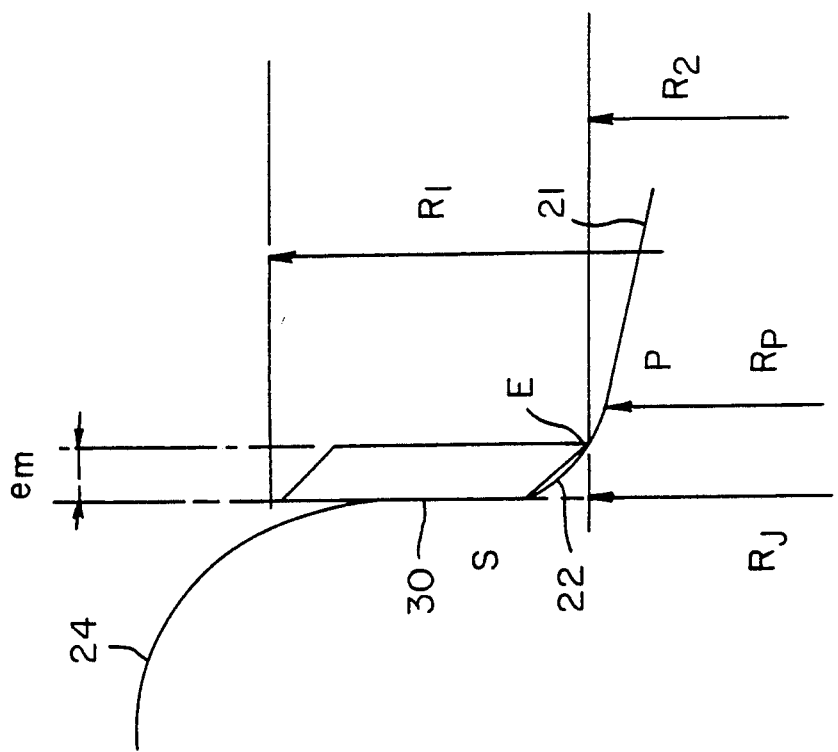
FIG. 3 is a detail view of a compensation wedge, the cross-section of which is a parallelogram.

The tire 1 with radial carcass reinforcement 10 is a tire of size 205/55 R 15 MXV, mounted on a "flat seat" rim 20. It comprises two beads 12, each provided with a bead wire 13 around which the carcass reinforcement 10 is wound. The rim 20, as seen in cross section, has a contour comprising essentially a rim seat 21 which forms an angle of 5°±1° with the axis of rotation of the tire, perpendicular to the equatorial plane XX', a rounding 22, and a vertical portion 23 forming the rim flange with a second rounding 24. The dimensions and characteristics of such a contour are standardized. Between the rim flanges 23 and the corresponding walls of the tire beads 12, compensation wedges 30 are provided on each side of the tire 1.

Figure 2:
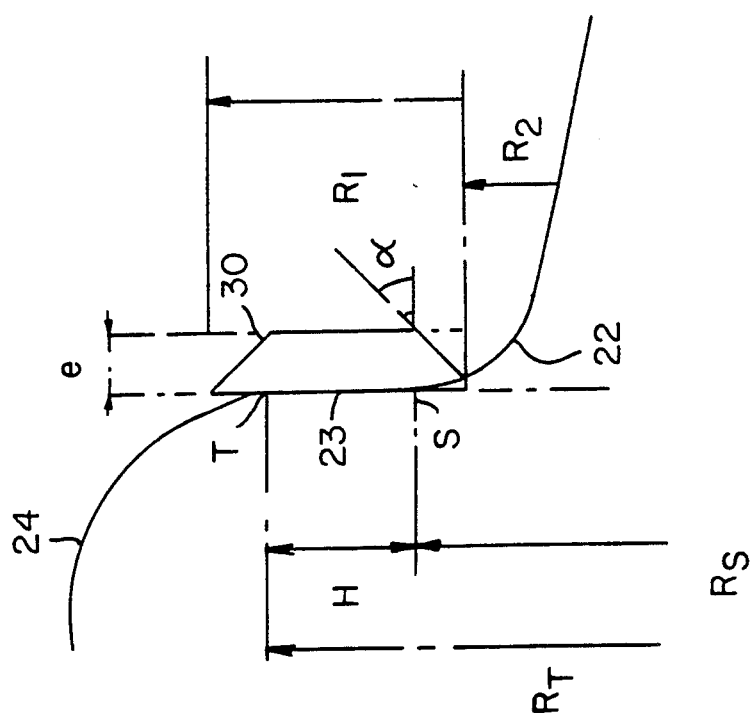
FIG. 2 is a detail view of a compensation wedge, of FIG. 1.

Referring to FIG. 2, the radially outer rounded portion 24 of the rim flange is tangent at the point T to the vertical wall 23, this point of tangency T being located radially at a distance $R_T$ from the axis of rotation of the tire 1. Similarly, the vertical wall 23 is tangent to the radially inner rounded portion 22 of the rim flange at a point S located a radial distance $R_S$ from the axis of rotation, the difference, $R_T - R_S = H$, representing then the height of the vertical wall 23 of the rim flange.

A wedge 30, such as shown in FIG. 2, is a circular ring of outer circumferential development equal to $2\pi R_1$, $R_1$ being at least equal to $R_T$ and of inner circumferential development $2\pi R_2$, $R_2$ being at most equal to $R_S$. The thickness e is constant over at least a height equal to the height H of the vertical wall 23 of the bead of the tire 20. The wedge shown in FIG. 2 has a cross-section of trapezoidal shape, the two bases of the trapezoid being connected by two sides forming an angle $\alpha$ of between 40° and 50° with said bases.

The compensation wedges 30 can also have a cross section in the shape of a parallelogram, as shown in FIG. 3, the inner circumferential development $2\pi R_2$ being then slightly less than the quantity $2\pi R_J$, $R_J$ being the standardized nominal radius of the rim. This shape permits obtaining the best possible contact between the bead of the tire, the wedge 30 and the rim flange.

By circumferential development slightly less than $2\pi R_J$, there is to be understood a development less than $2\pi R_J$ but greater than the value $2\pi R_P$, $R_P$ being the radius of the point of tangency P between the rim seat 21 and the rounded portion 22 (FIG. 3).

The thickness e of the compensation wedge 30, which is circumferentially variable, is determined in the following manner: After having obtained the signal representing the variation in total radial force ($F_R$) measured and recorded, the latter is broken down into its principal harmonics $F_{RH1}$, $F_{RH2}$, ... $F_{RH16}$ of the 1st to 16th order. The amplitudes of these sinusoidal movements are compared with pre-established control limits. FIG. 4 shows the case of the tire under study mounted on its service rim in which the amplitudes of harmonics of an order greater than 3 proved acceptable and in which the harmonic of the 3rd order, on the other hand, has too high an amplitude A3 as a function of the control limits imposed. The same is true furthermore of the amplitudes A2 and A1 of the harmonics of the second and first orders. Based on these harmonics of the 1st to 3rd order, the vibratory movement representing the variation in radial force ($F_{R3}$) upon one revolution of the wheel is then recomposed. This vibratory movement has an amplitude A measured between the maximum value $F_M$ and the minimum value $F_m$ (FIG. 5) for circumferential positions measured in degrees referred to a reference point formed materially on the tire at 192° and 348°, respectively. To the maximum value ($F_M$), there corresponds the maximum thickness ($e_M$) of the compensation wedge 30. To the minimum value ($F_m$), there corresponds the minimum thickness ($e_m$) of this same wedge 30. The constraints imposed by the manufacturing of the compensation wedges, whatever the material used, are such that the minimum value ($e_m$) cannot be less than 0.3 mm. Thus, for any compensation wedge 30, the minimum thickness is 0.3 mm.

As to the maximum value ($e_M$), it is a function of the measured amplitude (A) of the variation ($F_{Rn}$) in radial force. Thus, for the dimension studied, preliminary experiments carried out on a population of tires showed that, on the population of amplitudes (A) varying from 4daN to 15daN, the corrective thickness (e) varies from 0.8 mm to 2.6 mm, in a manner substantially proportional to the amplitude A. Taking into account the manufacturing tolerances of these wedges 30, the following table makes it possible to determine the necessary thickness as a function of the amplitude.

| A measured in daN | 4 to 5 | 5 to 6 | 6 to 7 | 7 to 8 | 8 to 9 | 9 to 10 | 10 to 11 | 11 to 12 | 12 to 13 | 13 to 14 |
|---|---|---|---|---|---|---|---|---|---|---|
| Corrective Thickness (e) in mm | 0.8 | 1.0 | 1.2 | 1.4 | 1.6 | 1.8 | 2.0 | 2.2 | 2.4 | 2.5 |

Figure 5:
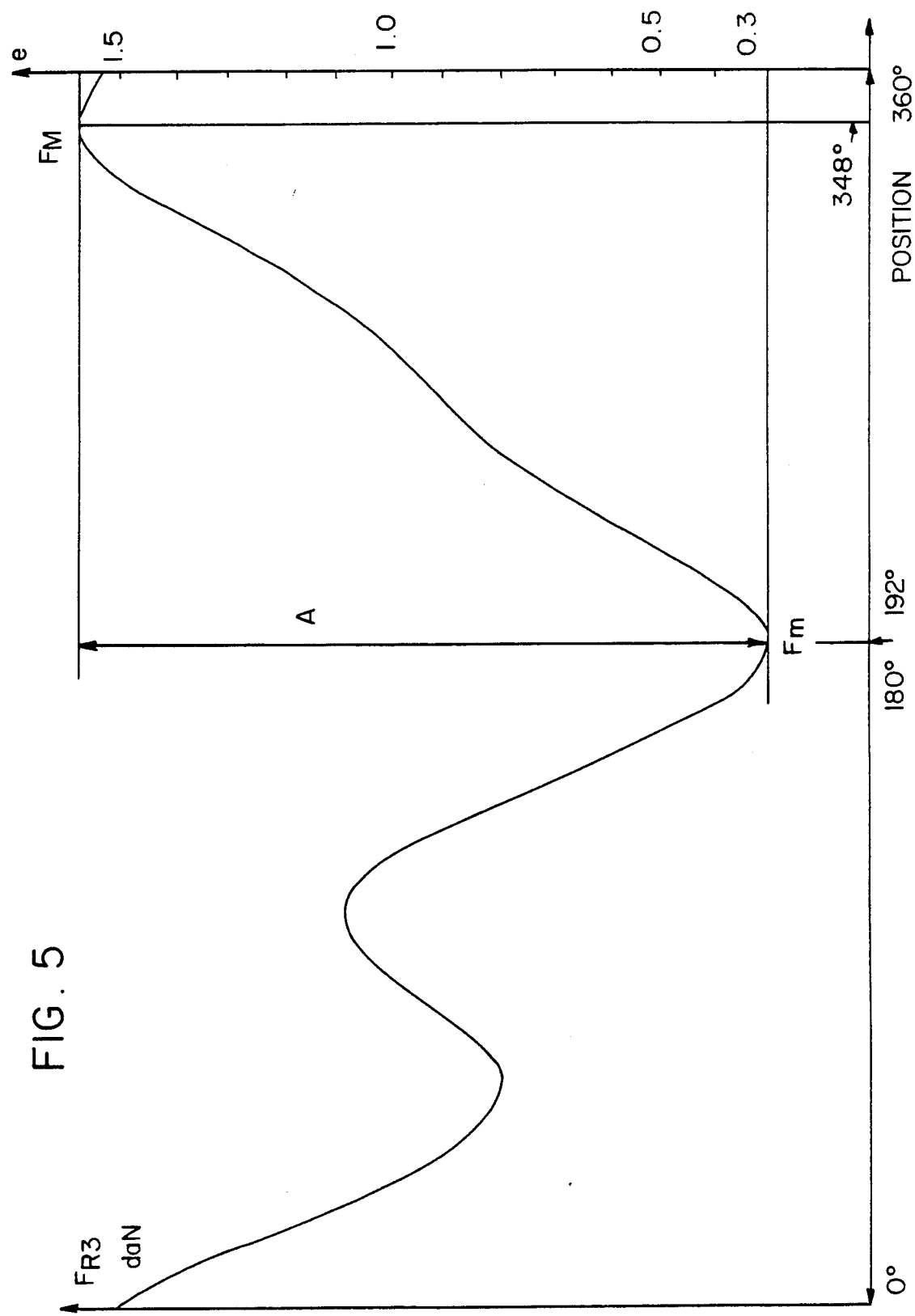
FIG. 5 shows the variation ($F_{Rn}$) recomposed on the basis of the harmonics of the first to third order.

Thus, in the example studied, the amplitude A obtained being 8.5 daN, the adapted compensation wedge 30 has a maximum thickness ($e_M$) of 1.6 mm and a minimum thickness ($e_m$) of 0.3 mm. Between these two values, the thickness (e) is subject to the same variations as the measured value ($F_{R3}$), as a function of the circumferential position. Entering on the ordinate axis a linear scale of the thickness values between 0.3 mm and, in the case studied, 1.6 mm, the same curve then gives the thickness (e) for each circumferential position (FIG. 5 on the right).

The same procedure applies when only the variation of the first harmonic ($F_{R1}$) is to be corrected, the compensation wedge 30 used then having a maximum thickness ($e_M$) at the level of the maximum value ($F_M$) and a thickness ($e_M$) of 0.3 mm at the level of the minimum value ($F_m$), being at 180° of the value ($F_M$) The thickness (e) then decreases rom ($e_M$) at 0.3 mm and then increases from 0.3 mm to ($e_M$), along a sine trigonometric function.

By way of example, for a 76/65 R 14 X tire having an amplitude ($A_1$) of 8.5 daN, the wedge 30 adapted to a maximum thickness ($e_M$) of 1.6 mm, decreasing on both sides of the circumferential position corresponding to the maximum of ($F_{R1}$) to reach 0.3 mm at the opposite position. The amplitude ($A_1$) is then reduced to 3.0 daN without the amplitudes of the other harmonic variations being modified.

FIG. 6 shows a tire 1 of size 235/75 R 17.5 X mounted on a rim 20 the seats 21 of which form angles of 15°±1° with the axis of rotation of the tire. Given the contour of the tire flange formed of circular arcs 22 and 24, it is not possible correctly to position compensation wedges 30 between the rim flanges and the corresponding walls of the tire 1. Thus, the wedges 30 are themselves placed between the seats 21 of the rim 20 and the corresponding seats of the beads 12 of the tire 1 which are provided with bead wires 13.

The wedge 30 used, as shown in FIG. 6, is in the form of a circular ring the cross-section of which has the shape of a parallelogram of elongated shape in axial direction and the two longer sides of which are parallel to the rim seat 21, the two shorter sides forming an angle of between 40° and 50° with the preceding sides.

The width $1_c$ of a wedge 30 defined as being the width of a large side of the cross section is at least equal to 80% of the width 1 of the bead 12 of tire 1. As to the thickness (e) of the wedge 30, measured perpendicular to the two large sides of the cross-section it, as in the preceding procedure, is variable circumferentially, the thickness (e) characteristics being defined in the same way, as a function of the variation in radial force studied.

As the tires, which use "15 seat" rims are primarily tires for "heavy vehicles," experience has shown that it is generally needless to take the variations in harmonics of an order higher than 1 into account.

For a 235/75 R 17.5 X tire mounted on a "15 seat" rim where only the variation of the first harmonic is taken into account, the compensation wedge 30 has a maximum thickness ($e_M$) of 2 mm, decreasing on both sides of the circumferential position corresponding to the minimum value of the first harmonic to reach 0.3 mm at the opposite circumferential position (at 180°), corresponding to the maximum value of the variation of the harmonic of the first order.

The amplitude ($A_1$) of the variation of the first harmonic then changes from a value of 47 daN to a clearly lower value of 15 daN.

Whatever the correction procedure employed, these compensation wedges are made of simple or composite plastic material or filled elastomeric material (vulcanizate), which material has a density of less than 1.2, this in order to avoid static or dynamic imbalance of the rolling assembly consisting of the tire 1 and the rim 20. Nevertheless, if such an imbalance is shown by a suitable measurement, it can be corrected by the customary methods, such as the placing of small additional weights on the rim. It is obvious that the material must have a compressive strength which is capable of withstanding the compressive forces exerted by the beads 12 of the tires both on the rim flanges and on the seats. These compressive forces are a function of numerous factors and are extremely variable, depending on the type of tire bead (15° or 5° seats), the type of bead wire used, the clamping of the bead wire on the rim, and the properties of the vulcanized mixes used around the bead wire. If the compressive strength of a wedge 30 is measured by the Shore D hardness at 20° C., this hardness may therefore vary greatly and be adaptable to any size of tire between the values of 40 to 90.

As possible material which can be used for the manufacture of these compensation wedges 30, mention may be made of plastic materials, such as rigid vinyl polychloride, polypropylene, polyamides of type 6 or 66, or plastic materials of an elastomeric nature, such as the thermoplastic elastomeric polyurethanes, or the vulcanizates, that is to say, the filled and vulcanizable elastomeric materials.

Depending on the material used and depending on the desired variations in thickness, these wedges 30 are obtained either, in the case of plastic material, by molding and machining or, in the case of vulcanizates, by extrusion or molding.

In order to perfect the desired positioning of these wedges 30 before and during the remounting of the tire 1 on the rim 20, these wedges can be held by bonding on beads of the tire. In the case of wedges of plastic material, a few points of bonding are sufficient, which bonding can be obtained in simple manner, for instance by means of glue or adhesive paper. Simple pieces of "scotch tape" or "double-face" adhesive paper are well suited. In the case of wedges of vulcanizable material, the wedges will advantageously be attached to the beads by a customary repair operation, that is to say, with the placing between the wedge and the bead of an elastomeric connecting rubber and dissolution layers, the assembly consisting of wedge, connecting rubber and dissolution, and bead being then heated to a given temperature in order to vulcanize the connecting rubber.

I claim:

1. A method of correcting defects in uniformity of a tire mounted on a rim the rim flanges of which have a portion perpendicular to the axis of rotation, which includes rolling the tire mounted, inflated and under load on the drum of a uniformity machine, graphically recording the variation in radial force of the rolling assembly consisting of tire and rim, and removing the tire from its rim, characterized by the fact that:

the variation in radial force ($F_R$) is broken down into its harmonics of the 1st to 16th order;

the variations in the harmonics are checked with respect to control limits which are not to be exceeded;

a variation of radial force ($F_{Rn}$) which takes into account the harmonic of the highest order which it is necessary to correct and all harmonics of lower order is recomposed;

the amplitude of the variation ($F_{Rn}$) thus obtained is determined as well as the circumferential positions of the optimums (maximum $F_M$ and minimum $F_m$) of this variation ($F_{Rn}$); and by placing, between the vertical walls (23) of the rim flanges (20) and the corresponding walls of the beads (12) on each side of the tire (1), a compensation wedge (30) in the form of a circular ring, the outside radius ($R_1$) of which is at least equal to the radius ($R_T$) of the point of tangency (T) between the upper rounded portion (24) and the vertical wall (23) of the flange of the rim (20), the inner radius ($R_2$) of which is at most equal to the radius ($R_S$) of the point of tangency (S) between the vertical wall (23) and the lower rounded portion (22) of the flange of the rim and the thickness (e) of which is constant radially over the height (H), and variable circumferentially between a maximum value ($e_M$) at the level of the maximum value ($F_M$) of the variation in radial force ($F_{Rn}$) and substantially proportional to the amplitude (A) of the variation ($F_{Rn}$) and a minimum value ($e_m$) of 0.3 mm at the level of the minimum value ($F_m$) of the variation ($F_{Rn}$), the value of the thickness (e) between these two extremes ($e_M$) and ($e_m$) for the point of the wedge (30) corresponding to the value (F) of the radial force measured being such that the quantity $e - 0.3$ in mm is proportional to the quantity $F - F_m$, the compensation wedge being made of a plastic or elastomeric simple or composite material of a density of at most 1.2.

2. A method according to claim 1, characterized by the fact that the compensation wedge (30) has a thickness (e) which decreases from a maximum value ($e_M$) at the level of the maximum value ($F_M$) of the first harmonic ($F_{R1}$) of the variation in radial force ($F_R$) to a minimum value ($e_m$) of 0.3 mm at the level of the minimum value ($F_m$) and increases from said minimum value to the maximum value ($e_M$), the variation of (e) as a function of the circumferential position being a sine function.

3. A method according to either of claims 1 and 2, characterized by the use of wedges (30) of a height (h) greater than the height (H) of the vertical wall (23) of the flange of the rim (20) and of quasi-trapezoidal cross-section, the bases of said section being parallel to the vertical wall (23) and the other two sides of said section forming an angle ($\alpha$) of between 40° and 50° with said bases.

4. A method according to either of claims 1 and 2, characterized by the use of compensation wedges (30) of a height (h) greater than the height (H) of the vertical wall (23) of the flange of the rim (20) and of parallelogram-shaped cross-section, the inner development of the wedge (30) being slightly less than the quantity $2\pi R_J$, $R_J$ being the nominal radius of the rim.

5. A method of correcting defects in uniformity of a tire mounted on a rim, the seats of which form an angle of 15°±1° with the axis of rotation of the tire, including measuring the amplitude and the circumferential positions of the optimums of the variation in radial force of the first harmonic by rolling on a uniformity machine, characterized by the fact that after measurements and demounting of the tire, there is placed between the seats (21) of the rim (20) and the seats of beads (12) of the tire (1) on each side of the tire (1), a compensation wedge (30) having a cross section in the shape of a parallelogram, the width ($l_c$) of which is at least equal to 80% of the width (1) of the bead (12), the thickness (e) of which, measured perpendicular to the seats (21) of the rim (20), is constant over a cross section but variable circumferentially between a value ($e_M$) which is maximum at the level of the minimum value ($F_m$) of the radial force $F_{R1}$) and a minimum value ($e_m$) of 0.3 mm at the level of the maximum value ($F_M$), the value ($e_M$) being proportional to the amplitude ($A_1$) of the variation ($F_{R1}$), the value of the thickness (e) at a point of the wedge corresponding to the radial force (F) being such that $e - 0.3$ mm is proportional to $F - F_m$, the compensation wedge being made of a plastic or elastomeric simple or composite material of a density of at most 1.2.

6. A method according to claims 1 or 2, characterized by the fact that the compensation wedges (30) are of plastic material and placed and maintained, either on the rim (20) or on the bead (12) of the tire (1) by simple adhesion by means of adhesive paper.

7. A method according to claims 1 or 2, characterized by the fact that the compensation wedges (30) are of filled elastomeric material and are applied on the beads (12) of the tire (1) by means of a connecting rubber and dissolution layers, the bead-wedge assembly undergoing localized partial vulcanization by the application of heat.

8. A method of making an annular compensation wedge ring for correcting the defects in the uniformity of a tire by being placed between vertical portions of the mounting rim and the beads of the tire comprising the steps of determining the variation in radial force of the inflated tire under load over a complete revolution and forming the annular compensation wedge ring of a plastic or elastomeric material having a density of at most 1.2 and a thickness which is at least 0.3 mm, the wedge being of constant thickness radially over its height and of variable thickness circumferentially, the circumferential variation in thickness varying from a minimum thickness value at the location of minimum radial force to a maximum thickness at the location of maximum radial force, the variation in thickness having the same direction as the variation in radial force.

9. A method as set forth in claim 8 in which the variation in radial force is determined for different orders or harmonics and including the steps of recomposing variation in the radial force for the range of harmonics determined and varying the circumferential thickness of the annular compensation wedge ring on the basis of the recomposed variation in radial force.

10. A method of making an annular compensation wedge ring for correcting defects in uniformity of a tire by being placed between the beads of a tire and the seats of a rim which form an angle of 15°±1° with the axis of rotation of the tire comprising determining the amplitude and the circumferential positions of the optimums of the variation in radial force of the first harmonic of the inflated tire under load over a complete revolution and forming the annular compensation wedge ring of plastic or elastomeric material having a density of at most 1.2 and a thickness which is at least 0.3 mm, the thickness of the wedge ring, measured perpendicular to the seat of the rim, being constant axially over its length but variable circumferentially between a maximum value at the location of the minimum value of the radial force and a minimum value at the location of the maximum value of the radial force, the variation in thickness varying inversely as the variation in radial force between minimum and maximum.

* * * * *